United States Patent [19]

Saxena et al.

[11] Patent Number: 5,728,768
[45] Date of Patent: Mar. 17, 1998

[54] ADDITION CURABLE COMPOSITION HAVING INCREASED RESISTANCE TO DEGRADATION BY ULTRAVIOLET LIGHT

[75] Inventors: Anil Kumar Saxena; Toshio Suzuki, both of Midland, Mich.

[73] Assignee: Dow Corning Corporation, Midland, Mich.

[21] Appl. No.: 772,535

[22] Filed: Dec. 24, 1996

[51] Int. Cl.[6] .................................................. C08F 8/00
[52] U.S. Cl. ........................ 524/506; 525/100; 525/105; 525/106
[58] Field of Search ........................... 524/506; 525/100, 525/105, 106

[56] References Cited

U.S. PATENT DOCUMENTS 5,409,995  4/1995  Iwahara et al. ........................ 525/100

FOREIGN PATENT DOCUMENTS 2075644   3/1990   Japan.
08283048  10/1996  Japan.
96/21633  7/1996   WIPO.

OTHER PUBLICATIONS

Macosko, C.W. et al., "The Hydrosilylation Cure of Polyisobutene", pp. 48–49.

*Primary Examiner*—Margaret W. Glass
*Attorney, Agent, or Firm*—Patricia M. Scaduto

[57] ABSTRACT

This invention relates to the preparation of an addition curable composition which when cured has increased resistance to degradation by ultraviolet light. The addition curable composition comprises an organic polymer having on average at least 1.4 alkenyl groups per molecule, a crosslinker having on average at least 2 hydrosilyl groups per molecule, a platinum group metal-containing catalyst and a benzotriazole derivative stabilizer.

26 Claims, No Drawings

5,728,768

ADDITION CURABLE COMPOSITION HAVING INCREASED RESISTANCE TO DEGRADATION BY ULTRAVIOLET LIGHT

BACKGROUND OF THE INVENTION

1. Field of the Invention

This invention relates to addition curable compositions comprising alkenyl functional organic polymers, hydrosilyl functional crosslinkers and benzotriazole derivative stabilizers which provide increased resistance to degradation by ultraviolet light.

2. Background Information

Silicone compounds are known for their weather resistance, water resistance and thermal stability, however they tend to be more expensive than their organic counterparts which don't have as good a property profile. Silicon modified organic materials may provide another option. For example, addition curable compositions which utilize a Si—H containing compound to crosslink an organic polymer having alkenyl groups are useful when cured as sealants, adhesives, coatings, molding and potting compounds, gels and additives.

Saam and Macosko, Polym. Prepr., 26 (2) 48–9 (1985) describe a platinum catalyzed addition reaction between a terminally unsaturated polyisobutylene (PIB) polymer and bifunctional $HMe_2SiOMe_2SiOSiMe_2H$ such that a copolymer forms or a tetrafunctional $Si(OSiMe_2H)_4$ which crosslinks the PIB polymer into an elastomer, in each case where Me is a methyl group.

Japanese Patent Application Kokai 2-75644 describes a curable resin composition comprising (A) a saturated hydrocarbon polymer containing at least one alkenyl group per molecule, (B) a polyorganohydrogen siloxane containing at least two hydrogen atoms bonded to silicon atoms per molecule, and (C) a platinum catalyst.

U.S. Pat. No. 5,409,995 describes a curable composition comprising (C) an organic curing agent having at least two hydrosilyl groups per molecule, prepared as described therein, (D) an organic polymer having at least one alkenyl group per molecule, and (E) a hydrosilyation catalyst.

It appears, however, that these cured silicon modified organic materials degrade on exposure to ultraviolet light. Although there are ultraviolet stabilizers which are known for reducing ultraviolet degradation of other polymer systems, most of these compounds will suppress or poison the catalytic activity of the catalysts needed to crosslink the addition curable composition. Therefore, a method is needed whereby the process of curing these compositions by addition is not significantly affected and the cured compositions have increased resistance to degradation by ultraviolet light.

The inventors have unexpectedly determined that by adding certain benzotriazole derivatives, crosslinking of the addition curable composition is not significantly affected and the cured composition has increased resistance to degradation by ultraviolet light.

The objective of this invention is to prepare an addition curable composition having increased resistance to degradation by ultraviolet light.

SUMMARY OF THE INVENTION

The objective of this invention can be achieved by preparing an addition curable composition using specific benzotriazole derivatives which do not significantly affect the cure process. The addition curable composition comprises an organic polymer having on average at least 1.4 alkenyl groups per molecule, a crosslinker having on average at least 2 hydrosilyl groups per molecule, a platinum group metal containing catalyst and a benzotriazole derivative stabilizer. A method to prepare the same is also claimed.

DETAILED DESCRIPTION OF THE INVENTION

This invention relates to an addition curable composition comprising a product formed from components comprising:

(A) 100 parts by weight of an organic polymer having on average at least 1.4 alkenyl groups per molecule;

(B) an amount sufficient to cure the composition of a crosslinker having on average at least 2 hydrosilyl groups per molecule;

(C) a platinum group metal containing catalyst in an amount sufficient to effect curing of the composition; and (D) 0.1 to 5 parts by weight of a benzotriazole derivative stabilizer.

Component (A) is an organic polymer having on average at least 1.4 alkenyl groups per molecule. The organic polymer may be linear or branched and may be a homopolymer, copolymer or terpolymer. The organic polymer may also be present as a mixture of different organic polymers so long as there is on average at least 1.4 alkenyl groups per polymer molecule. Specific examples of the polymer chain include a polyether such as polyoxyethylene, polyoxypropylene, polyoxytetramethylene, polyoxyethylene-polyoxypropylene; a polyester prepared by a condensation of a dibasic acid such as adipic acid and a glycol or by a ring-opening polymerization of lactones; ethylene-propylene copolymer; a polybutylene such as polyisobutylene; a copolymer of isobutylene with isoprene or the like; polychloroprene; polyisoprene; a copolymer of isoprene with butadiene, acrylonitrile, styrene or the like; polybutadiene; a copolymer of butadiene with styrene, acrylonitrile or the like; and a polyolefin prepared by hydrogenating polyisoprene, polybutadiene, or a copolymer of isoprene or butadiene with acrylonitrile, styrene or the like.

The preferred organic polymer comprises a homopolymer or a copolymer selected from the group consisting of a polyether, a polyester, a polybutylene where the polybutylene chain may comprise repeat units such as isobutylene; 1-ethylene; and 1,2-dimethylethylene; as well as rearranged products such as n-butylene and 1-methylpropylene, a polyisoprene, a polybutadiene, a copolymer of isobutylene and isoprene, a copolymer of isoprene and butadiene, a copolymer of isoprene and styrene, a copolymer of butadiene and styrene, a copolymer of isoprene, butadiene and styrene and a polyolefin polymer prepared by hydrogenating polyisoprene, polybutadiene or a copolymer of isoprene and styrene, a copolymer of butadiene and styrene or a copolymer of isoprene, butadiene and styrene.

It is more preferred that the organic polymer comprises a homopolymer or copolymer wherein at least 50 mole percent of the repeat units are isobutylene units.

One or more hydrocarbon monomers, such as isomers of butylene, styrene, derivatives of styrene, isoprene and butadiene may be copolymerized with the isobutylene, the preferred co-monomer being selected from 1-butene, α-methylstyrene, p-methylstyrene and isoprene. It is even more preferred that the organic polymer comprise at least 80 mole percent of the isobutylene repeat units described above. Most preferably, the organic polymer, other than the alkenyl groups, is a homopolymer consisting essentially of isobutylene repeat units.

The alkenyl groups of the organic polymer are not limited and the preferable alkenyl group is of the formula:

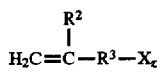

wherein $R^2$ is a hydrogen atom or a methyl radical, $R^3$ is a divalent hydrocarbon radical having between 1 and 18 carbon atoms, z is 0 or 1 and X is a group other than carbon, bonding the alkenyl group to the main chain of the organic polymer and can be an ether, ester, carbonate, amide, urethane or siloxane linkage. Examples of alkenyl groups include vinyl, allyl, 5-hexenyl and octadecenyl. Allyl and allyl ether groups are preferred.

The alkenyl groups may be found pendant along the polymer chain or at the chain ends, with it being preferable for the alkenyl groups to be at the chain ends. It is most preferred that the majority of the organic polymer molecules have an alkenyl group at each chain end.

While there must be on average at least 1.4 alkenyl groups per organic polymer molecule, it is preferred that each polymer molecule have on average at least 1.8 alkenyl groups and more preferred that each polymer molecule have on average at least 2 alkenyl groups.

The alkenyl group may be introduced into the organic polymer by known methods. Typically, the alkenyl groups may be introduced after polymerization or during polymerization.

A method for introducing the alkenyl group after the polymerization includes, for example, reacting an organic polymer having a functional group such as a hydroxyl group or an alkoxide group at the chain end, in the main chain or in the side chain, with an organic compound having an alkenyl group and an active group which is reactive to said functional group so as to introduce the alkenyl group onto the polymer chain at that point. Specific examples of such organic compounds are a $C_3$–$C_{20}$ unsaturated aliphatic acid, acid halide and acid anhydride such as acrylic acid, methacrylic acid, vinyl acetate, acrylic chloride and acrylic bromide; a $C_3$–$C_{20}$ unsaturated aliphatic acid substituted halide such as allyl chloroformate ($CH_2CHCH_2OCOCl$) and allyl bromoformate ($CH_2CHCH_2OCOBr$); allyl chloride, allyl bromide, vinyl(chloromethyl)benzene, allyl (chloromethyl)benzene, allyl(bromomethyl)benzene, allyl chloromethyl ether, allyl(chloromethoxy)benzene, 1-butenyl chloromethyl ether, 1-hexenyl(chloromethoxy)benzene, allyloxy(chloromethyl)benzene and isocyanate functional $C_3$–$C_{20}$ unsaturated aliphatic organic compounds or isocyanate functional silanes having alkenyl groups, such as $Vi(CH_3)_2Si(CH_2)_3NCO$ where Vi is vinyl.

A method for introducing the alkenyl group during the polymerization includes, for example, introducing the alkenyl group into the main chain or at the chain end of the polymer by using a vinyl monomer which has an alkenyl group having a low radical reactivity in the molecule such as allyl methacrylate and allyl acrylate or a radical chain transfer agent which has an alkenyl group having a low radical reactivity such as allyl mercaptan when the organic polymer is prepared by a radical polymerization.

The bonding manner of the alkenyl group to the main chain of the organic polymer is not limited. The alkenyl group may directly bond to the main chain of the organic polymer by a carbon-carbon linkage, or it may bond to the main chain of the organic polymer through an ether, ester, carbonate, amide, urethane or siloxane linkage.

The butylene polymers useful herein may be prepared by methods known in the art, such as described in Kennedy, et al. U.S. Pat. No. 4,758,631 which is hereby incorporated by reference. One telechelic butylene polymer, for example, is available from Kaneka Corporation (Japan) under the tradename EPION™.

The number average molecular weight of the organic polymer may be from 500 to 300,000, preferably from 2000 to 20,000 and most preferably from 5000 to 17,000.

The present composition requires the presence of an amount sufficient to cure the composition of a crosslinker having on average at least 2 hydrosilyl or Si—H groups per molecule (Component (B)). Depending on the average alkenyl groups per molecule, the average Si—H groups per molecule will increase as necessary to ensure crosslinking. Although the crosslinker must contain on average at least 2 hydrosilyl groups per molecule and no more than one silicon-bonded hydrogen atom per silicon atom, there is no other restriction on the crosslinker. For example, the crosslinker may be an organic molecule containing the required hydrosilyl groups as described in Iwahara, et al, U.S. Pat. No. 5,409,995 which is hereby incorporated by reference.

Preferably, the crosslinker is an organohydrogensilane or organohydrogensiloxane where the remaining valences of the hydrogen bonded silicon atoms are satisfied for example by oxygen atoms or monovalent hydrocarbon radicals comprising one to twenty carbon atoms. The monovalent hydrocarbons radicals can be, for example, alkyls such as methyl, ethyl, propyl, tertiary butyl, and hexyl; cycloalkyls such as cyclohexyl; aryls such as phenyl and tolyl; and halogen substituted alkyls such as 3,3,3-trifluoropropyl and perfluoropropyl. Preferred is when all of the monovalent hydrocarbon radicals are methyl.

Organohydrogensiloxanes are more preferred as the crosslinker and examples of organohydrogensiloxanes useful as crosslinkers in the present composition are described, for example, in Lee et al., U.S. Pat. No. 3,989,668; Jensen, U.S. Pat. No. 4,753,978 and Iwahara, et al, U.S. Pat. No. 5,409,995, each of which are incorporated herein by reference. The organohydrogensiloxane crosslinker can be a homopolymer, a copolymer or mixtures thereof, containing for example, diorganosiloxy units, organohydrogensiloxy units, triorganosiloxy units and $SiO_2$ units. The organohydrogensiloxane crosslinker can be linear, cyclic and branched polymers and copolymers. It is preferred to add a linear organohydrogensiloxane.

The most preferred crosslinkers are methylhydrogen siloxane linears $(Me)_3SiO((Me)(H)SiO)_b((Me)_2SiO)_cSi(Me)_3$ where b is from 2 to 50, more preferably from about 3 to 20, and c is from 0 to 50, more preferably from about 0 to 20, in each case where Me is methyl.

The amount of crosslinker useful in the present composition is that sufficient to crosslink the composition. Generally, a useful amount of crosslinker is that amount sufficient to provide a molar ratio of hydrosilyl groups to alkenyl groups of the organic polymer within a range of 0.4:1 to 10:1. Preferred is where the molar ratio of hydrosilyl groups of the crosslinker to alkenyl groups of the organic polymer is within a range of about 0.5:1 to 5:1.

The crosslinker may be added as a single species or as a mixture of two or more different species.

A platinum group metal-containing catalyst (Component (C)) is used in the curable composition in an amount sufficient to promote curing of the composition. The platinum group metal-containing catalyst can be any such catalyst which is known to catalyze hydrosilation reactions. By "platinum group metal" it is meant ruthenium, rhodium, palladium, osmium, iridium, and platinum. A group of platinum group metal-containing catalysts particularly useful in the present composition are the platinum complexes prepared as described by Willing, U.S. Pat. No. 3,419,593, and Brown et al., U.S. Pat. No. 5,175,325, each of which is hereby incorporated by reference to show such complexes and their preparation. Preferred catalysts are complexes of platinum with vinylsiloxane. Other examples of useful platinum group metal-containing catalyst can be found in Lee et al., U.S. Pat. No. 3,989,668; Chang et al., U.S. Pat. No. 5,036,117; Ashby, U.S. Pat. No. 3,159,601; Lamoreaus, U.S. Pat. No 3,220,972; Chalk et al., U.S. Pat. No. 3,296,291; Modic, U.S. Pat. No. 3,516,946; Karstedt, U.S. Pat. No. 3,814,730; and Chandra et al., U.S. Pat. No. 3,928,629 all of which are hereby incorporated by reference to show useful platinum group metal-containing catalyst and methods for their preparation.

The amount of catalyst useful in effecting curing of the present composition is not narrowly limited as long as there is a sufficient amount present to accelerate a reaction between the hydrosilyl groups and the alkenyl groups. The appropriate amount of the catalyst will depend upon the particular catalyst used. In general as low as about 0.1 parts by weight of platinum group metal based on 1 million parts by weight of organic polymer may be useful (ie. 0.1 ppm). Preferably the amount of platinum group metal is from about 1 to 100 ppm. More preferred is from about 10 ppm to about 50 ppm of platinum group metal.

The platinum group metal-containing catalyst may be added as a single species or as a mixture of two or more different species. Adding the catalyst as a single species is preferred.

The inventors have unexpectedly determined that the addition of certain benzotriazole derivative compounds to an addition curable composition does not significantly affect the cure process and the cured composition has increased resistance to degradation upon exposure to ultraviolet light.

Component (D) comprises a benzotriazole derivative stabilizer.

This benzotriazole derivative stabilizer has the following general formula (I):

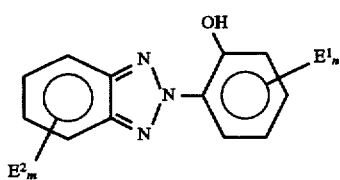

where $E^1$ is individually selected from alkyl groups having from 1 to 10 carbon atoms; $E^2$ is a halogen atom; m is 0 or 1; and n is 0, 1 or 2.

For preferred benzotriazole derivative stabilizers, $E^1$ is individually selected from a methyl radical, an isopropyl radical, a 1,1,3,3-tetramethylbutyl radical or a tertiary butyl radical; $E^2$ is chlorine; m is 0 or 1 and n is 1 or 2. Examples of these benzotriazole derivative stabilizers include 2-(3,5-di-t-butyl-2-hydroxy phenyl)-5-chlorobenzotriazole, commercially known as Tinuvin® 327, 2-(2H-benzotriazol-2-yl)-6-(1-methyl-1-phenylethyl)-4-(1,1,3,3-tetramethylbutyl-phenol, commercially known as Tinuvin® 928 and available from Ciba-Geigy Corporation and 2-(2H-benzotriazol-2-yl)-4-(1,1,3,3-tetramethylbutyl)-phenol, available from Aldrich.

The most preferred benzotriazole derivative stabilizers are Tinuvin® 327 (Structure (A)) and 2-(2H-benzotriazol-2-yl)-4-(1,1,3,3-tetramethylbutyl)phenol (Structure (B)).

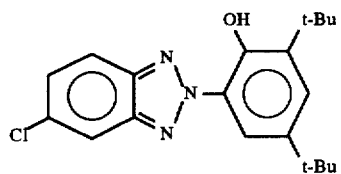

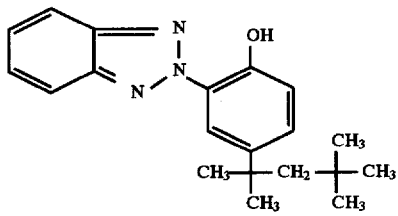

Generally, the amount of benzotriazole derivative stabilizer used should be that amount which provides increased resistance to UV degradation in the cured composition without significantly affecting the cure process. Typically, 0.1 to 5 parts by weight benzotriazole derivative stabilizer based on 100 parts by weight organic polymer should be sufficient. Preferably, the stabilizer is added in an amount from 0.5 to 2 parts by weight.

The benzotriazole derivative stabilizer may be added as a single species or as a mixture of two or more different species.

The present composition may cure rapidly at room temperature. To slow this curing process an inhibitor may be added to the composition. The inhibitor can be any of those materials known to inhibit the catalytic activity of platinum group metal-containing catalysts. By the term "inhibitor" it is meant a material that retards the room temperature curing of the composition when incorporated in the composition at less than about 10 weight percent of the composition, without preventing the elevated temperature curing of the composition.

Inhibitors for platinum group metal-containing catalysts are well known in the art. A preferred class of inhibitors useful in the present composition are acetylenic alcohols as described in Kookootsedes et al., U.S. Pat. No. 3,445,420, which is incorporated herein by reference. Such acetylenic alcohols are exemplified by ethynylcyclohexanol and methylbutynol. Other examples of classes of inhibitors which may be useful in the present composition are described in Chung et al., U.S. Pat. No. 5,036,117, which is incorporated herein by reference.

The amount of inhibitor useful in the present composition is not known to be critical and can be any amount that will retard the reaction of the hydrosilyl groups with the alkenyl groups, while not preventing the reaction at elevated temperatures. The specific amount of inhibitor to be used will depend upon the particular inhibitor used, the concentration and type of catalyst, and the nature and amounts of organic polymer and crosslinker. Generally, when an inhibitor is used it is preferred that at least one mole of inhibitor be present for each mole of platinum group metal in the composition and that the inhibitor not exceed one weight percent of the composition.

In addition to the above ingredients, the composition may include additives which impart or enhance certain properties of the cured composition or facilitate processing of the curable composition. Typical additives include, but are not limited to, adhesion promoters, fillers, plasticizers, functional and non-functional diluents, pigments, dyes and thermal stabilizers. The effect of any such additives should be evaluated as to their result and impact on other properties of the composition.

The addition curable composition of this invention may be prepared by mixing all the ingredients together. It is preferred for the ingredients to be mixed using a static mixer, a dynamic mixer or both. When all of the ingredients are mixed together, the composition may begin to cure unless a cure inhibitor is present. If the composition is not to be used immediately after mixing, it should be prepared in at least two parts. Separating the organic polymer, Si—H containing crosslinker and the benzotriazole derivative stabilizer in one part which can be referred to as a "base portion" and having the catalyst in another part, the individual parts will not cure. At the time of application, the contents of the two parts are mixed together and curing occurs.

If thermal stability is also desired in the cured composition, a hindered amine may be added to the composition. As described in more detail in Saxena et al, Ser. No. 08/773,018. "Addition Curable Compositions Having Increased Thermal Stability," filed concurrently hereto, which is hereby incorporated herein by reference, the hindered amine provides increased thermal stability for the cured composition, without significantly affecting curing.

The following examples are presented to further illustrate the compositions and method of this invention, but are not to be construed as limiting the invention, which is delineated in the claims. Any parts or percentages in the examples are on a weight basis and all measurements were obtained at room temperature (25±2° C.) unless indicated to the contrary.

Telechelic allyl-functional polyisobutylene (Allyl PIB) was prepared by the method described in U.S. Pat. No. 4,758,631 to Kennedy, hereby incorporated by reference. This PIB had a number average molecular weight ($M_n$) of 5,050 and a weight average molecular weight (Mw) of 6,600. The degree of allyl end capping was determined by using signals from the aromatic carbon atoms of the polymerization initiator as internal reference in a $^{13}C$ nuclear magnetic resonance (NMR) analysis, this functionality being 1.9±0.1.

EXAMPLE 1

Samples were prepared to examine the effects of various additives on platinum catalyzed cure at room temperature. Each sample contained 3 g Allyl-PIB, 0.192 g Me$_3$SiO (MeHSiO)$_5$(Me$_2$SiO)$_3$SiMe$_3$ (SiH:Allyl=1.18:1), 0.6 g KP-32, a paraffin plasticizer, available from Idemitsu Corporation (KP-32), 0.03 g of a mixture of a platinum vinylsiloxane complex and Panalan® L-14E, a hydrogenated polybutene available from Amoco Corporation (Panalane) containing 0.1% Pt (giving 10 parts platinum (ppm) based on 1 million parts Allyl PIB), and one of the following additives: 0.033 g 2-(2H-benzotriazol-2-yl)-4-(1,1,3,3-tetramethylbutyl)-phenol, available from Aldrich; 0.033 g 5-phenyl-1H-tetrazole, available from Aldrich; 0.035 g benzotriazole, available from Aldrich; 0.034 g Tinuvin® 327, 2-(3,5-di-t-butyl-2-hydroxy phenyl)-5-chlorobenzotriazole, available from Ciba-Geigy; 0.04 g Tinuvin® 770 DF, bis(2,2,6,6-tetramethyl-4-piperidinyl) decanedioate, available from Ciba-Geigy; 0.034 g Chimassorb® 944 FL, N,N'-bis(2,2,6,6-tetramethyl-4-piperidinyl)-1,6-hexane diamine polymer with 2,4,6-trichloro-1,3,5-triazine and 2,4,4-trimethyl-1,2-pentanamine, available from Ciba-Geigy and 0.035 g Irganox® B 900, a blend of 20% Irganox 1076, octadecyl 3,5-di-t-butyl-4-hydroxy hydrocinnamate and 80% Irgafos 168 [tris-(2,4-di-t-butylphenyl)- phosphite] available from Ciba-Geigy Corporation. All the contents were mixed thoroughly in an aluminum pan and set aside at room temperature for various times.

The results are given in Table 1.

TABLE 1

Effect of Additives On Platinum Catalyzed Cure Of SiH/Allyl-PIB At Room Temperature.

| Additive | 10 Minutes | 30 Minutes | 3 Hours |
|---|---|---|---|
| Tinuvin 770 | no cure | Gel | Rubbery |
| 2-(2H-benzotriazol-2-yl)-4-(1,1,3,3-tetramethylbutyl)phenol* | Gel | Rubbery | Complete |
| 5-Phenyl-1H-tetrazole | Gel | Rubbery | Complete |
| Benzotriazole | no cure | no cure | no cure |
| Tinuvin 327* | Rubbery | Rubbery | Complete |
| Irganox B900 | no cure | no cure | no cure |
| Chimassorb 944 | Rubbery | Rubbery | Complete |
| No Additive | Rubbery | Rubbery | Complete |

*These compounds are within the scope of the invention, the others are for comparison The samples containing benzotriazole and Irganox B900 did not cure at all.

EXAMPLE 2

Samples were prepared to examine the effects of various additives on platinum catalyzed cure at elevated temperature. Each sample contained 5 g Allyl-PIB, 0.32 g Me$_3$SiO (MeHSiO)$_5$(Me$_2$SiO)$_3$SiMe$_3$ (SiH:Allyl =1.177:1), 1 g KP-32, 0.05 g of a mixture of a platinum vinylsiloxane complex and Panalane containing 0.1% Pt (giving 10 parts platinum (ppm) based on 1 million parts Allyl PIB), and 0.05 g of one of the following additives: 1,3,5-triethylhexahydro-1,3,5-triazine, available from Aldrich; 2-(2-piperidinoethyl)pyridine available from Aldrich, 2-(2H-benzotriazol-2-yl)-4-(1,1,3,3-tetramethylbutyl)-phenol, available from Aldrich; 5-phenyl-1H-tetrazole, available from Aldrich; benzotriazole, available from Aldrich and Tinuvin® 327, available from Ciba-Geigy. All the contents were mixed thoroughly in an aluminum pan and set aside at 120° C. for 8 min. The results are given in Table 2.

TABLE 2

Effect Of Additives On Platinum Catalyzed Cure Of SiH/Allyl-PIB At 120° C.

| Additive | After 8 Minutes |
|---|---|
| Benzotriazole | Soft and Sticky |
| 1,3,5-Triethylhexahydro-1,3,5-triazine | Not Cured |
| 2-(2-Piperidinoethyl)pyridine | Not Cured |
| 2-(2H-benzotriazol-2-yl)-4-(1,1,3,3-tetramethylbutyl)phenol* | Cured |
| 5-Phenyl-1H-tetrazole | Cured |
| Tinuvin-327* | Cured |
| No Additive | Cured |

*These compounds are within the scope of the invention, the others are for comparison

EXAMPLE 3

Samples were prepared to examine the effects of various additives on exposure to ultraviolet (UV) light. Each sample contained 50 g Allyl-PIB, 5 g KP-32, 3 g Me$_3$SiO(MeHSiO)$_5$(Me$_2$SiO)$_3$SiMe$_3$ (SiH:Allyl=1.10:1), 2.5 g a mixture of methyl butynol in Panalane containing 0.1% methyl butynol, 0.05 g of one of the additives described in Table 3, and 0.5 g of a mixture of a platinum vinylsiloxane complex and Panalane containing 0.1% Pt (giving 10 parts platinum (ppm) based on 1 million parts Allyl PIB). The chemicals are listed in order of their mixing sequence. Methyl butynol was added to increase the pot life of the mixture. All the contents were mixed thoroughly in a Hausechild® dental mixer cup. The cup was placed in the mixer and mixed twice for 12 sec. Enough time was given for cooling before platinum was added. The contents were poured onto a stainless steel mold which was lined with TEFLON® films. A hot press was used at 120° C. for 20 minutes. The average thickness of the film was 1.5±0.125 mm. The films were aged at room temperature for 1 week. Bars were cut by a die press for testing.

The mechanical properties of the films were measured. Tensile measurements were done on a SINTECH tensiometer with 11.35 kg load. The gauge length was set at 50 mm and crosshead speed was 500 mm/minute. Bars having a length of 7.62 cm were used. The neck was 2.54 cm long and 0.3175 cm wide. Three readings were taken for every additive. Durometer hardness (Shore A) was measured according to ASTM D-2240. See Table 3 for results.

TABLE 3

Effects Of UV Exposure On The Mechanical Properties Of Cured Allyl-PIB Films

|   |   | Exposure (Hours) | | | | |
|---|---|---|---|---|---|---|
|   |   | 0 | 503 | 819 | 1085 | 1832 |
| 1 | Durometer | 16 | 13 | 9 | 12 | 8 |
| Chimassorb 944 | % Elong @ Break | 133 | 136 | 159 | 153 | 147 |
|   | Break Stress MPa | 0.39 | 0.23 | 0.17 | 0.19 | 0.19 |
|   | Stress at 50% MPa | 0.17 | 0.1 | 0.05 | 0.06 | 0.09 |
|   | Stress at 100% MPa | 0.29 | 0.17 | 0.1 | 0.12 | 0.13 |
| 2 | Durometer | 26 | 16 | 20 | 13 | 13 |
| Irganox 1010 | % Elong @ Break | 81 | 89 | 94 | 105 | 116 |
|   | Break Stress MPa | 0.45 | 0.24 | 0.2 | 0.24 | 0.24 |
|   | Stress at 50% MPa | 0.31 | 0.15 | 0.11 | 0.13 | 0.15 |
|   | Stress at 100% MPa | — | 0.2 | 0.11 | 0.21 | 0.17 |
| 3 | Durometer | 24 | 22 | 22 | 20 | 23 |
| Subs Phenol"* | % Elong @ Break | 113 | 106 | 118 | 131 | 147 |
|   | Break Stress MPa | 0.53 | 0.48 | 0.46 | 0.53 | 0.57 |
|   | Stress at 50% MPa | 0.26 | 0.26 | 0.22 | 0.24 | 0.24 |
|   | Stress at 100% MPa | 0.47 | 0.46 | 0.39 | 0.42 | 0.4 |
| 4 | Durometer | 26 | 25 | 23 | 24 | 23 |
| Tinuvin 327* | % Elong @ Break | 108 | 108 | 105 | 120 | 116 |
|   | Break Stress MPa | 0.57 | 0.57 | 0.46 | 0.57 | 0.58 |
|   | Stress at 50% MPa | 0.3 | 0.3 | 0.24 | 0.27 | 0.32 |
|   | Stress at 100% MPa | 0.53 | 0.53 | 0.44 | 0.48 | 0.51 |
| 5 | Durometer | 25 | 18 | 13 | 13 | 12 |
| Tinuvin 770 | % Elong @ Break | 100 | 122 | 134 | 147 | 138 |
|   | Break Stress MPa | 0.48 | 0.33 | 0.2 | 0.24 | 0.31 |
|   | Stress at 50% MPa | 0.27 | 0.15 | 0.08 | 0.08 | 0.19 |
|   | Stress at 100% MPa | 0.51 | 0.26 | 0.14 | 0.15 | 0.21 |
| 6 | Durometer | 26 | 18 | 18 | 9 | 7 |
| No Additive | % Elong @ Break | 99 | 107 | 121 | 145 | 149 |
|   | Break Stress MPa | 0.51 | 0.28 | 0.24 | 0.32 | 0.4 |
|   | Stress at 50% MPa | 0.28 | 0.15 | 0.11 | 0.12 | 0.26 |
|   | Stress at 100% MPa | 0.52 | 0.24 | 0.19 | 0.22 | 0.33 |

"Subs Phenol = 2-(2H-benzotriazol-2-yl)-4-(1,1,3,3-tetramethylbutyl)-phenol
*These compounds are within the scope of the invention, the others are for comparison The bars were then mounted on aluminum panels and placed for weathering. A Q-U-V® accelerated weather tester was used for the weathering of the samples. The ultraviolet light was shone on the samples for 8 hours followed by 4 hours of condensation and again 7.5 hours of light followed by 4.5 hours of condensation. The temperature of the panels was 45° C. The bulbs were changed every 400 hours and were of UVB 313 type. Thickness was determined by ASTM D-624. The results are given in Table 4.

TABLE 4

Effects Of UV Exposure On Appearance And Thickness of Cured PIB Films

| Sample | Property | Exposure (Hours) | | | | |
|---|---|---|---|---|---|---|
| | | 0 | 503 | 819 | 1085 | 1832 |
| 1 | Appearance | NS | S | G, GM, S | G, O, S | LO, VS |
| Chimassorb 944 | Thickness (mm) | 1.425 | 1.4 | 1.25 | 1.2 | 0.75 |
| 2 | Appearance | NS | S | VGM, S | G, S | O, VS |
| Irganox 1010 | Thickness (mm) | 1.55 | 1.5 | 1.425 | 1.4 | 0.975 |
| 3 | Appearance | NS | SS | SS | SS | NO, SS |
| Subs Phenol"* | Thickness (mm) | 1.55 | 1.55 | 1.625 | 1.525 | 1.575 |
| 4 | Appearance | NS | SS | SS | SS | NO, SS |
| Tinuvin 327* | Thickness (mm) | 1.55 | 1.575 | 1.65 | 1.55 | 1.55 |
| 5 | Appearance | NS | S | G, S | O, S | |
| Tinuvin 770 | Thickness (mm) | 1.525 | 1.475 | 1.6 | 1.4 | 1.15 |
| 6 | Appearance | NS | S | O, VS | G, LO, S | G, O, VS |
| No Additive | Thickness (mm) | 1.5 | 1.525 | 1.55 | 1.25 | 0.925 |

S = Sticky, G = Glossy, GM = Gummy, O = Material Oozing, SS = Slightly Sticky, LO = Lot of Oozing, NO = No Oozing, SO = Some Oozing, VS = Very Sticky, NS = Non Sticky
"Subs Phenol = 2-(2H-benzotriazol-2-yl)-4-(1,1,3,3-tetramethylbutyl)-phenol
*These compounds are within the scope of the invention, the others are for comparison The results show that Tinuvin® 327 and 2-(2H-benzotriazol-2-yl)-4-(1,1,3,3-tetramethylbutyl)phenol considerably increase the resistance of the cured composition to degradation by UV light and at the same time do not significantly affect the platinum catalyzed cure.

We claim:

1. An addition curable composition comprising:

(A) 100 parts by weight of an organic polymer having on average at least 1.4 alkenyl groups per molecule;

(B) an amount sufficient to cure the composition of a crosslinker having on average at least 2 hydrosilyl groups per molecule;

(C) a platinum group metal containing catalyst in an amount sufficient to effect curing of the composition; and (D) 0.1 to 5 parts by weight of a benzotriazole derivative stabilizer which is selected from the group consisting of

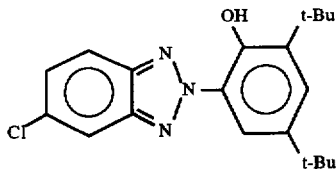

and

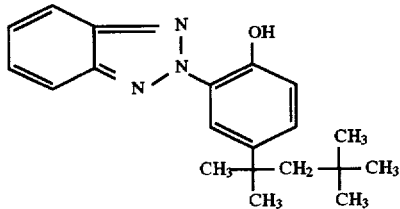

where, t—Bu is a tertiary butyl group.

2. The addition curable composition of claim 1 wherein the organic polymer has on average at least 1.8 alkenyl groups per molecule and is selected from the group consisting of a polyether, a polyester, a polybutylene, a polyisoprene, a polybutadiene, a copolymer of isobutylene and isoprene, a copolymer of isoprene and butadiene, a copolymer of isoprene and styrene, a copolymer of butadiene and styrene, a copolymer of isoprene, butadiene and styrene and a polyolefin polymer prepared by hydrogenating polyisoprene, polybutadiene or a copolymer of isoprene and styrene, a copolymer of butadiene and styrene or a copolymer of isoprene, butadiene and styrene.

3. The addition curable composition of claim 2 wherein at least 50 mole percent of the repeat units of the organic polymer are isobutylene units.

4. The addition curable composition of claim 3, wherein the organic polymer has on average at least 2 alkenyl groups per molecule and at least 80 mole percent of the repeat units are isobutylene units.

5. The addition curable composition of claim 4, wherein the organic polymer, other than the alkenyl groups, is a homopolymer consisting essentially of isobutylene repeat units.

6. The addition curable composition of claim 5, wherein the alkenyl groups are allyl groups placed at the organic polymer chain ends.

7. The addition curable composition of claim 1, wherein the amount of crosslinker added to the composition provides a ratio of hydrosilyl groups to alkenyl groups of the organic polymer within a range of about 0.4:1 to 10:1.

8. The addition curable composition of claim 3, wherein the amount of the crosslinker added to the composition provides a ratio of hydrosilyl groups to alkenyl groups of the organic polymer within a range of about 0.5:1 to 5:1 and the crosslinker is an organohydrogensiloxane.

9. The addition curable composition of claim 3, wherein the amount of the crosslinker added to the composition provides a ratio of hydrosilyl groups to alkenyl groups of the organic polymer within a range of about 0.5:1 to 5:1 and the crosslinker is $(Me)_3SiO(Me)(H)SiO)_b((Me)_2SiO)_cSi(Me)_3$ where b is from 2 to 50 and c is from 0 to 50, in each case where Me is methyl.

10. The addition curable composition of claim 3, wherein the platinum group metal containing catalyst comprises platinum as the platinum group metal and the amount added to the composition is from 0.1 to 200 parts by weight of platinum based on 1 million parts of the organic polymer.

11. The addition curable composition of claim 3, wherein the platinum group metal containing catalyst is a platinum vinylsiloxane complex and the amount added to the composition is from about 1 part to 100 parts by weight of platinum based on 1 million parts of the organic polymer.

12. The addition curable composition of claim 8, comprising 0.5 to 2 parts by weight of the benzotriazole derivative stabilizer.

13. The addition curable composition of claim 9, comprising 0.5 to 2 parts by weight of the benzotriazole derivative stabilizer.

14. The addition curable composition of claim 1, and further comprising an inhibitor.

15. A method of preparing an addition curable composition comprising mixing:
   (A) 100 parts by weight of an organic polymer having on average at least 1.4 alkenyl groups per molecule;
   (B) an amount sufficient to cure the composition of a crosslinker having on average at least 2 hydrosilyl groups per molecule;
   (C) a platinum group metal containing catalyst in an amount sufficient to effect curing of the composition; and
   (D) 0.1 to 5 parts by weight of a benzotriazole derivative stabilizer which is selected from the group consisting of

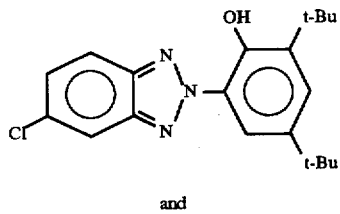

and

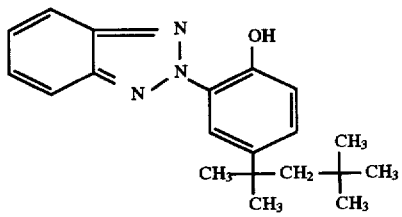

where, t—Bu is a tertiary butyl group;
   using a mixer selected from the group consisting of a static mixer and a dynamic mixer.

16. The method of claim 15 wherein the organic polymer has on average at least 1.8 alkenyl groups per molecule and is selected from the group consisting of a polyether, a polyester, a polybutylene, a polyisoprene, a polybutadiene, a copolymer of isobutylene and isoprene, a copolymer of isoprene and butadiene, a copolymer of isoprene and styrene, a copolymer of butadiene and styrene, a copolymer of isoprene, butadiene and styrene and a polyolefin polymer prepared by hydrogenating polyisoprene, polybutadiene or a copolymer of isoprene and styrene, a copolymer of butadiene and styrene or a copolymer of isoprene, butadiene and styrene.

17. The method of claim 16, wherein the organic polymer has on average at least 2 alkenyl groups per molecule and at least 80 mole percent of the repeat units are isobutylene units.

18. The method of claim 17, wherein the organic polymer, other than the alkenyl groups, is a homopolymer consisting essentially of isobutylene repeat units.

19. The method of claim 16, wherein the amount of the crosslinker added to the composition provides a ratio of hydrosilyl groups to alkenyl groups of the organic polymer within a range of about 0.5:1 to 5:1 and the crosslinker is an organohydrogensiloxane.

20. The method of claim 17 wherein the amount of the crosslinker added to the composition provides a ratio of hydrosilyl groups to alkenyl groups of the organic polymer within a range of about 0.5:1 to 5:1 and the crosslinker is $(Me)_3SiO((Me)(H)SiO)_b((Me)_2SiO)_cSi(Me)_3$ where b is from 2 to 50 and c is from 0 to 50, in each case where Me is methyl.

21. The method of claim 17, wherein the platinum group metal containing catalyst is a solution of a platinum vinylsiloxane complex and the amount added to the composition is from about 1 part to 100 parts by weight of platinum based on 1 million parts of the organic polymer.

22. The method of claim 19, comprising 0.5 to 2 parts by weight of the benzotriazole derivative stabilizer.

23. The method of claim 15, and further comprising mixing an inhibitor into the addition curable composition.

24. A cured product formed by curing the composition prepared by the method of claim 15.

25. A product formed by mixing components comprising:
   (A) 100 parts by weight of an organic polymer having on average at least 1.4 alkenyl groups per molecule;
   (B) an amount sufficient to cure the composition of a crosslinker having on average at least 2 hydrosilyl groups per molecule;
   (C) a platinum group metal containing catalyst in an amount sufficient to effect curing of the composition; and
   (D) 0.1 to 5 parts by weight of a benzotriazole derivative stabilizer which is selected from the group consisting of

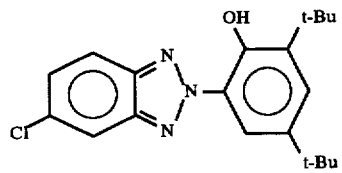

and

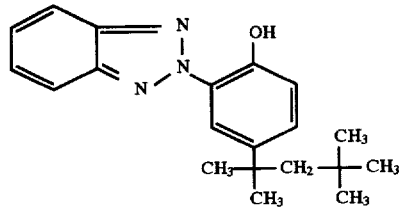

where, t—Bu is a tertiary butyl group.

26. The product of claim 25, wherein at least 50 mole percent of the repeat units of the organic polymer are isobutylene units; the amount of the crosslinker added to the composition provides a ratio of hydrosilyl groups to alkenyl groups of the organic polymer within a range of about 0.5:1 to 5:1 and the crosslinker is an organohydrogensiloxane.

* * * * *